US012712971B2

(12) United States Patent
Chau

(10) Patent No.: US 12,712,971 B2
(45) **Date of Patent: *Aug. 18, 2026**

(54) TRANSCRIBING INTERACTIVE VOICE RESPONSE MENU OPTIONS TO GENERATE VISUALIZATIONS DURING A CALL

(71) Applicant: Zoom Communications, Inc., San Jose, CA (US)

(72) Inventor: Vi Dinh Chau, Seattle, WA (US)

(73) Assignee: Zoom Communications, Inc., San Jose, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 18/638,369

(22) Filed: Apr. 17, 2024

(65) Prior Publication Data

US 2024/0267463 A1 Aug. 8, 2024

Related U.S. Application Data

(63) Continuation of application No. 18/181,080, filed on Mar. 9, 2023, now Pat. No. 11,991,309, which is a (Continued)

(51) Int. Cl.
*H04M 3/51* (2006.01)
*G10L 15/26* (2006.01)
(Continued)

(52) U.S. Cl.
CPC ........... *H04M 3/5166* (2013.01); *G10L 15/26* (2013.01); *H04M 1/72469* (2021.01); (Continued)

(58) Field of Classification Search
CPC ........... H04M 3/5166; H04M 1/72469; H04M 3/493; H04M 3/567; H04M 3/568; (Continued)

(56) References Cited

U.S. PATENT DOCUMENTS 6,408,272 B1 * 6/2002 White ..................... G10L 15/30
704/E15.047
7,027,990 B2 4/2006 Sussman
(Continued)

*Primary Examiner* — Lisa Hashem
(74) *Attorney, Agent, or Firm* — Young Basile Hanlon & MacFarlane, P.C.

(57) ABSTRACT

A method includes connecting a call from a client device to a destination having an interactive voice response service; transcribing audio from the destination during the call to identify menu options of the interactive voice response service; generating visualizations representing the menu options; and outputting the visualizations to a display associated with the client device. A system includes a telephony system, an automatic speech recognition processing tool, and a visualization output generation tool. The telephony system connects a call from a client device to a destination having an interactive voice response service. The automatic speech recognition processing tool transcribes audio from the destination during the call to identify menu options of the interactive voice response service. The visualization output generation tool generates visualizations representing the menu options. The telephony system outputs the visualizations to a display associated with the client device.

20 Claims, 11 Drawing Sheets

Related U.S. Application Data continuation of application No. 17/237,139, filed on Apr. 22, 2021, now Pat. No. 11,627,223.

(51) Int. Cl.
*H04M 1/72469* (2021.01)
*H04M 3/493* (2006.01)
*H04M 3/56* (2006.01)

(52) U.S. Cl.
CPC .......... *H04M 3/493* (2013.01); *H04M 3/567* (2013.01); *H04M 3/568* (2013.01); *H04M 2201/40* (2013.01); *H04M 2201/42* (2013.01); *H04M 2203/256* (2013.01)

(58) Field of Classification Search
CPC ......... H04M 2201/40; H04M 2201/42; H04M 2203/256; H04M 3/4936; H04M 2203/254; G10L 15/26
See application file for complete search history.

(56) References Cited

U.S. PATENT DOCUMENTS

| | | | | |
|---|---|---|---|---|
| 7,092,738 | B2 | 8/2006 | Creamer et al. | |
| 7,450,954 | B2 | 11/2008 | Randall | |
| 8,081,749 | B1 | 12/2011 | Shaffer et al. | |
| 8,406,388 | B2 | 3/2013 | Or-Bach et al. | |
| 8,537,989 | B1 | 9/2013 | Lavian et al. | |
| 8,548,131 | B1 | 10/2013 | Lavian et al. | |
| 8,548,135 | B1 | 10/2013 | Lavian et al. | |
| 8,553,859 | B1 | 10/2013 | Lavian et al. | |
| 8,572,303 | B2 | 10/2013 | Lavian et al. | |
| 8,594,280 | B1 | 11/2013 | Or-Bach et al. | |
| 8,625,756 | B1 | 1/2014 | Lavian et al. | |
| 8,666,046 | B2 | 3/2014 | Ozeri et al. | |
| 8,687,777 | B1 | 4/2014 | Lavian et al. | |
| 8,903,073 | B2 | 12/2014 | Or-Bach et al. | |
| 8,976,945 | B2 | 3/2015 | Patel | |
| 8,989,369 | B1 | 3/2015 | Asghari et al. | |
| 9,001,819 | B1 | 4/2015 | Or-Bach et al. | |
| 9,628,623 | B2 | 4/2017 | Vymenets et al. | |
| 9,966,072 | B2 | 5/2018 | Ruiz Rodriguez | |
| 9,978,367 | B2 | 5/2018 | Aleksic et al. | |
| 10,009,740 | B2 | 6/2018 | Langevin et al. | |
| 10,250,749 | B1 | 4/2019 | Boone et al. | |
| 10,579,330 | B2 | 3/2020 | Koul et al. | |
| 10,659,501 | B2 | 5/2020 | Klemm et al. | |
| 10,922,890 | B1 | 2/2021 | Pusch et al. | |
| 10,929,561 | B2 | 2/2021 | Long et al. | |
| 10,979,568 | B1 | 4/2021 | Lu et al. | |
| 11,102,342 | B2 | 8/2021 | Dhawan et al. | |
| 11,457,109 | B2 | 9/2022 | Myers et al. | |
| 11,627,223 | B2 | 4/2023 | Chau | |
| 11,722,737 | B1 | 8/2023 | Arazi | |
| 2002/0013709 | A1* | 1/2002 | Ortega | G10L 15/22 704/E15.04 |
| 2002/0090943 | A1 | 7/2002 | Kwon | |
| 2003/0074198 | A1* | 4/2003 | Sussman | G10L 15/22 704/E15.04 |
| 2004/0121814 | A1* | 6/2004 | Creamer | H04M 1/72469 455/566 |
| 2006/0018443 | A1* | 1/2006 | Knott | H04M 3/493 379/88.16 |
| 2006/0293897 | A1 | 12/2006 | White et al. | |
| 2007/0135101 | A1 | 6/2007 | Ramati et al. | |
| 2008/0226042 | A1 | 9/2008 | Singh | |
| 2010/0150322 | A1* | 6/2010 | Yin | H04M 3/537 379/88.14 |
| 2011/0246172 | A1 | 10/2011 | Liberman et al. | |
| 2012/0008755 | A1 | 1/2012 | Mittal | |
| 2013/0094633 | A1 | 4/2013 | Mauro | |
| 2013/0282381 | A1* | 10/2013 | Mauro | G06F 3/167 704/E21.001 |
| 2014/0126713 | A1 | 5/2014 | Ristock et al. | |
| 2014/0161249 | A1 | 6/2014 | Tolksdorf | |
| 2015/0169336 | A1 | 6/2015 | Harper et al. | |
| 2015/0237196 | A1 | 8/2015 | Song et al. | |
| 2017/0270929 | A1 | 9/2017 | Aleksic et al. | |
| 2017/0374198 | A1 | 12/2017 | de Silva et al. | |
| 2018/0020093 | A1 | 1/2018 | Bentitou et al. | |
| 2018/0146090 | A1 | 5/2018 | Lavian et al. | |
| 2019/0251961 | A1 | 8/2019 | Wang et al. | |
| 2020/0007493 | A1 | 1/2020 | Nair et al. | |
| 2021/0064680 | A1 | 3/2021 | Maheshwari et al. | |
| 2021/0084153 | A1* | 3/2021 | Paiva | H04M 3/5233 |
| 2021/0136210 | A1 | 5/2021 | Paiva | |
| 2021/0281682 | A1 | 9/2021 | Agarwal et al. | |
| 2021/0400138 | A1 | 12/2021 | Andar et al. | |
| 2022/0115020 | A1 | 4/2022 | Bradley et al. | |
| 2023/0005483 | A1 | 1/2023 | Garg et al. | |

* cited by examiner

TRANSCRIBING INTERACTIVE VOICE RESPONSE MENU OPTIONS TO GENERATE VISUALIZATIONS DURING A CALL

CROSS-REFERENCE TO RELATED APPLICATION(S)

This application is a continuation of U.S. application Ser. No. 18/181,080, filed Mar. 9, 2023, which is a continuation of U.S. application Ser. No. 17/237,139, filed Apr. 22, 2021, the entire disclosures of which are herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for displaying visual interactive voice response menu options.

One aspect of this disclosure is a method, which includes connecting a call from a client device to a destination having an interactive voice response service, transcribing audio from the destination during the call to identify menu options of the interactive voice response service, generating visualizations representing the menu options, and outputting the visualizations to a display associated with the client device.

Another aspect of this disclosure is a system, which includes a telephony system, an automatic speech recognition processing tool, and a visualization output generation tool. The telephony system is configured to connect a call from a client device to a destination having an interactive voice response service and to output visualizations representing menu options of the interactive voice response service to a display associated with the client device. The automatic speech recognition processing tool is configured to transcribe audio from the destination during the call to identify the menu options. The visualization output generation tool is configured to generate the visualizations representing the menu options.

Another aspect of this disclosure is an apparatus including a memory and a processor configured to execute instructions stored in the memory to connect a call from a client device to a destination having an interactive voice response service, route audio from the destination during the call to a first tool configured to transcribe audio from the destination, receive visualizations representing menu options of the interactive voice response service from a second tool configured to generate the visualizations, and output the visualizations to a display associated with the client device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
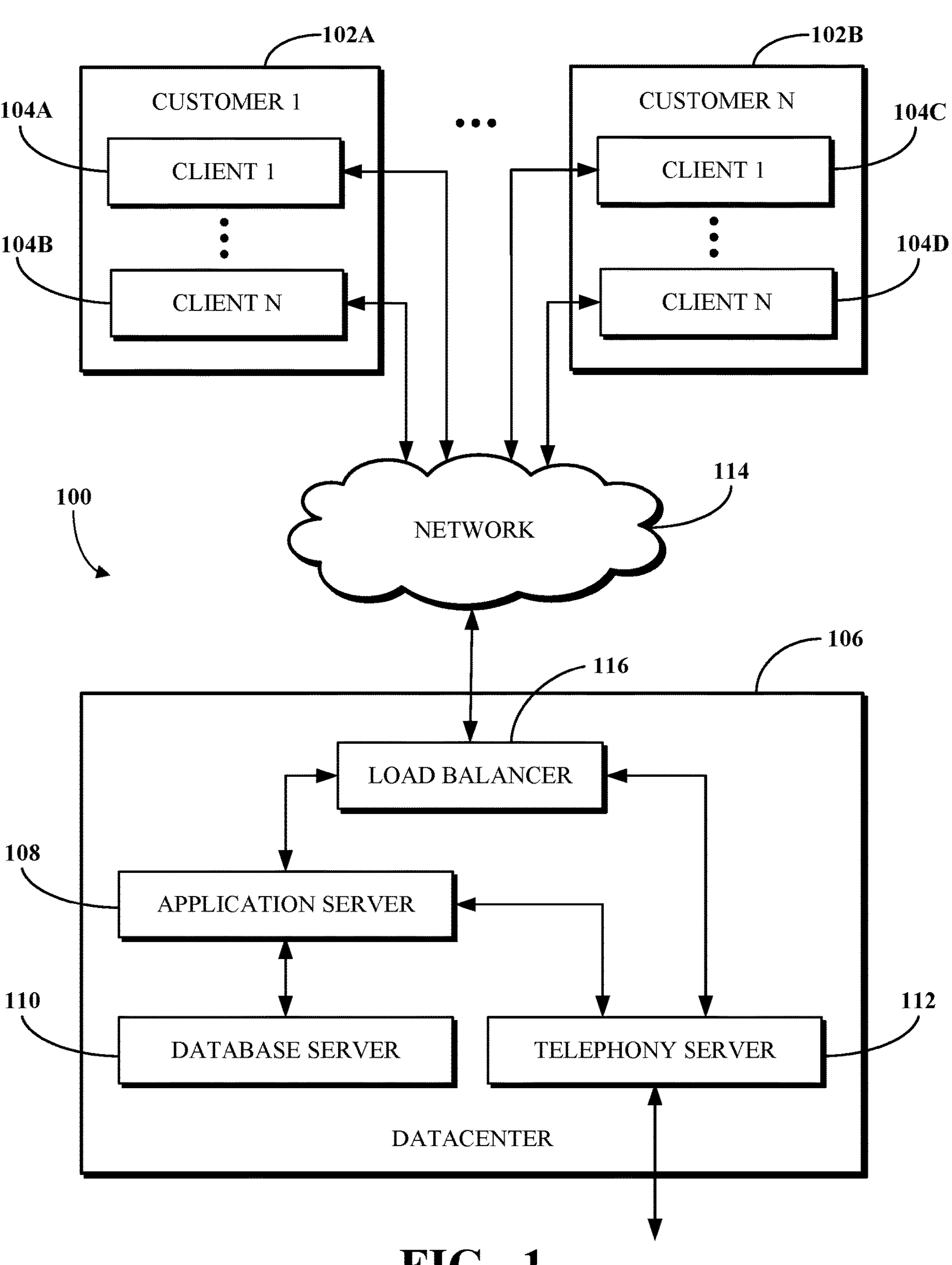
FIG. 1 is a block diagram of an example of an electronic computing and communications system.

When an operator of a client device (e.g., a mobile device, a physical phone, or a computer) makes a call, the call is received by a telephony system. In some cases, the telephony system may present an interactive voice response (IVR) menu including options (e.g., press 1 for sales, 2 for support, etc.) for selection by the caller, such as to route the call to an appropriate party. Traditionally, the IVR menu options are audibly communicated to the caller via a handset or speaker of the client device. However, callers often forget some or all of the menu options and may need the menu to be repeated before they identify the response to enter. In some cases, a menu option may be inaudible or read by the recording in a strange way such that the caller erroneously ignores or misinterprets it.

One approach to address these issues with a traditional IVR service is to visually present the IVR menu options to the caller. For example, the client device from which a call is placed may include a display, and visualizations of the menu options may be output for viewing by the caller at the display. However, existing solutions which use visual IVR require pre-population of the IVR menu options within a data store. Then during a call, those pre-populated IVR menu options are retrieved from the data store and processed to cause the visualizations at the display of the caller's device.

Implementations of this disclosure address problems such as these by connecting a call from a client device to a destination having an interactive voice response service; transcribing audio from the destination to identify menu options of the interactive voice response service; generating visualizations representing the menu options; and outputting the visualizations to a display associated with the client device. As used herein, the term "destination" includes, but is not limited to, a service being called by the client device and any hardware used to implement the service.

A telephony system creates a visualization of an IVR menu which can be output to a display available to a caller. A process (e.g., a real-time transcription process, such as an "automated speech recognition" (ASR) process which performs natural language processing against speech in one or more languages) listens to audio coming through the call from either end (i.e., from the telephony system or from the caller). It is noted that while the description refers to an "ASR process" or "ASR processing," the operation of embodiments and implementations would remain the same if another real-time transcription process were performed. The ASR process generates a display of the IVR menu options based on the transcription of audio sent from the destination called by the caller to a device of the caller. For example, when an operator places a call through a telephony system, the telephony system locates the service connected to the number and performs a real-time transcription to determine what is being said in an IVR menu option. The telephony system then sends a signal to display that information visually to the caller at their client device (e.g., a visual prompt representing text corresponding to the IVR menu option). The same would apply if the call is outside of the telephony system (e.g., to an external telephony system), such as where the call goes through the telephony system to connect to the external telephony system, which may have its own IVR system. The telephony system in such a case would act as an intermediary to translate the audible IVR to display it visually for the caller. In one use case, the client device is registered with the telephony system and/or a software platform associated therewith, for example, a UCaaS platform.

In some cases, where the client device is a non-video-enabled phone (e.g., a desktop phone), the visual properties could be extended to a secondary device associated with the same caller (e.g., as known to the telephony system). For example, a channel can be opened with a video-enabled device registered with the caller responsive to a determination that the device from which the call is placed is not video-enabled.

In a use case, the call is routed through an external telephony system and the audio stream is received by the telephony system. The telephony system listens to all of the audio stream, and sends the audio stream to the client device together with the IVR menu options for display. In one implementation, the IVR prompt information is returned through the external telephony system to the client device and the client device then sends the audio stream to the telephony system for natural language processing, and the IVR menu options are returned to the client device for display. In this way, the client device operates as an intermediary between the telephony system and the external telephony system. In one implementation, a channel can be created directly between the telephony system and the external telephony system so that the client device is not used as an intermediary. This would be useful where the client device is not registered with telephony system, but calls into a destination with IVR, and where the call maintains access to the external telephony system.

In a use case, a similar transcription process may be used to provide a video of the visualized IVR menu options. The endpoint display of the client device may still show text options or buttons so the caller does not have to memorize the IVR menu options. In some such cases, a threshold check may be performed to determine if the client device is video-enabled before sending a video-based version of the IVR menu options.

To describe some implementations in greater detail, reference is first made to examples of hardware and software structures used to implement a visual IVR system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
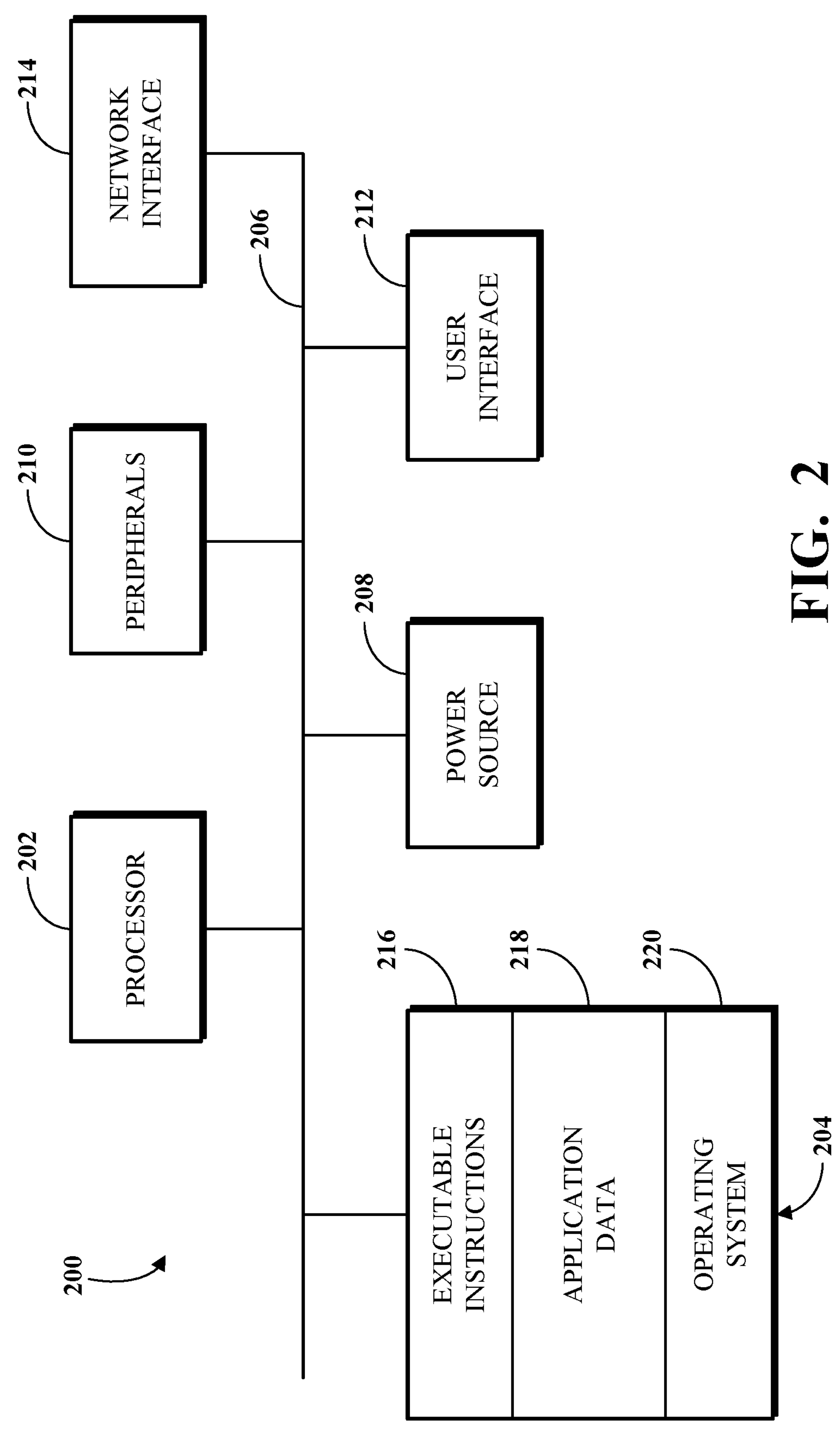
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
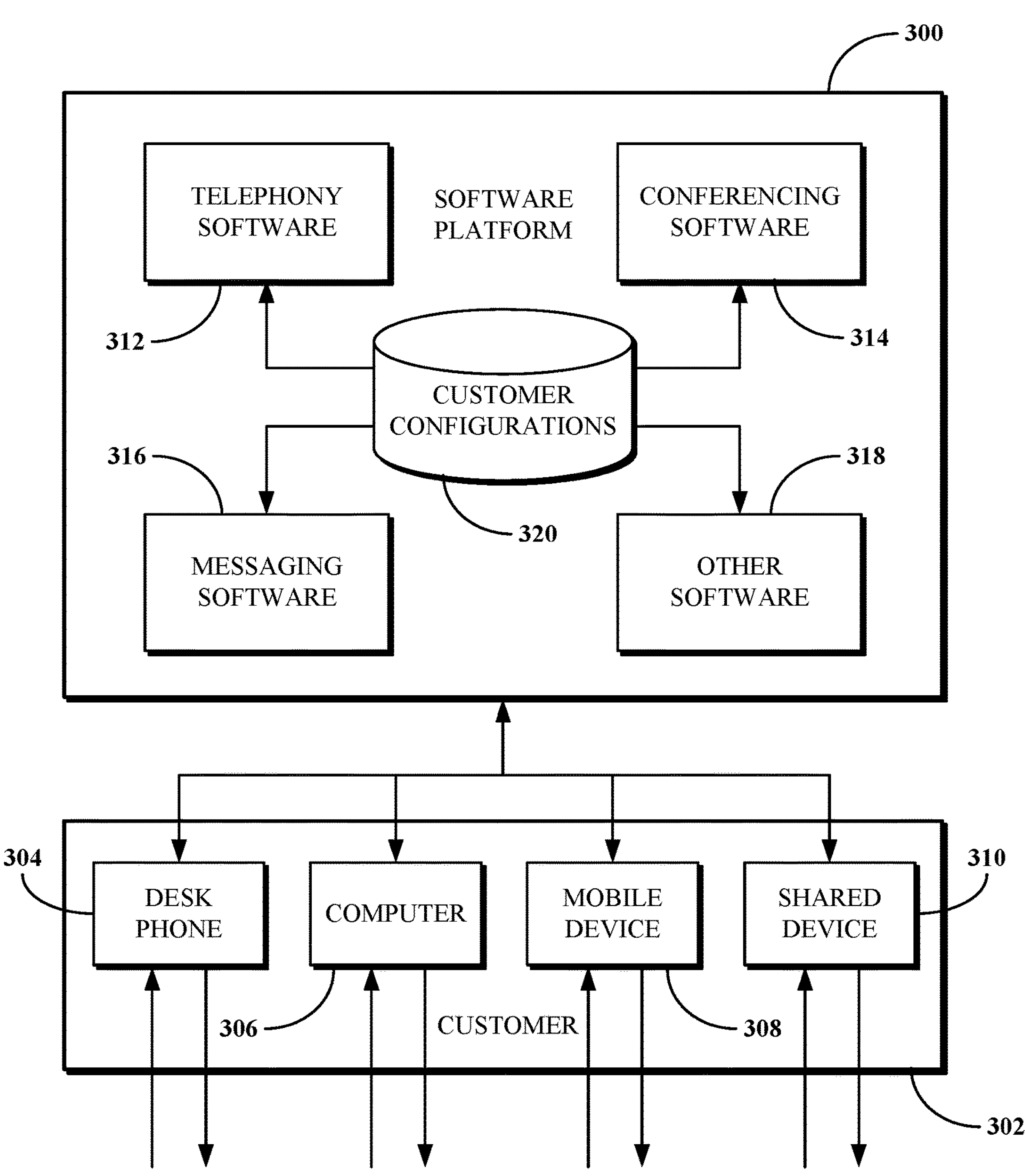
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software configured to transcribe, in real-time, an audio stream of a call from a destination to determine visual IVR menu options and to transmit visualizations of the IVR menu options for display at a client device or other associated device.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
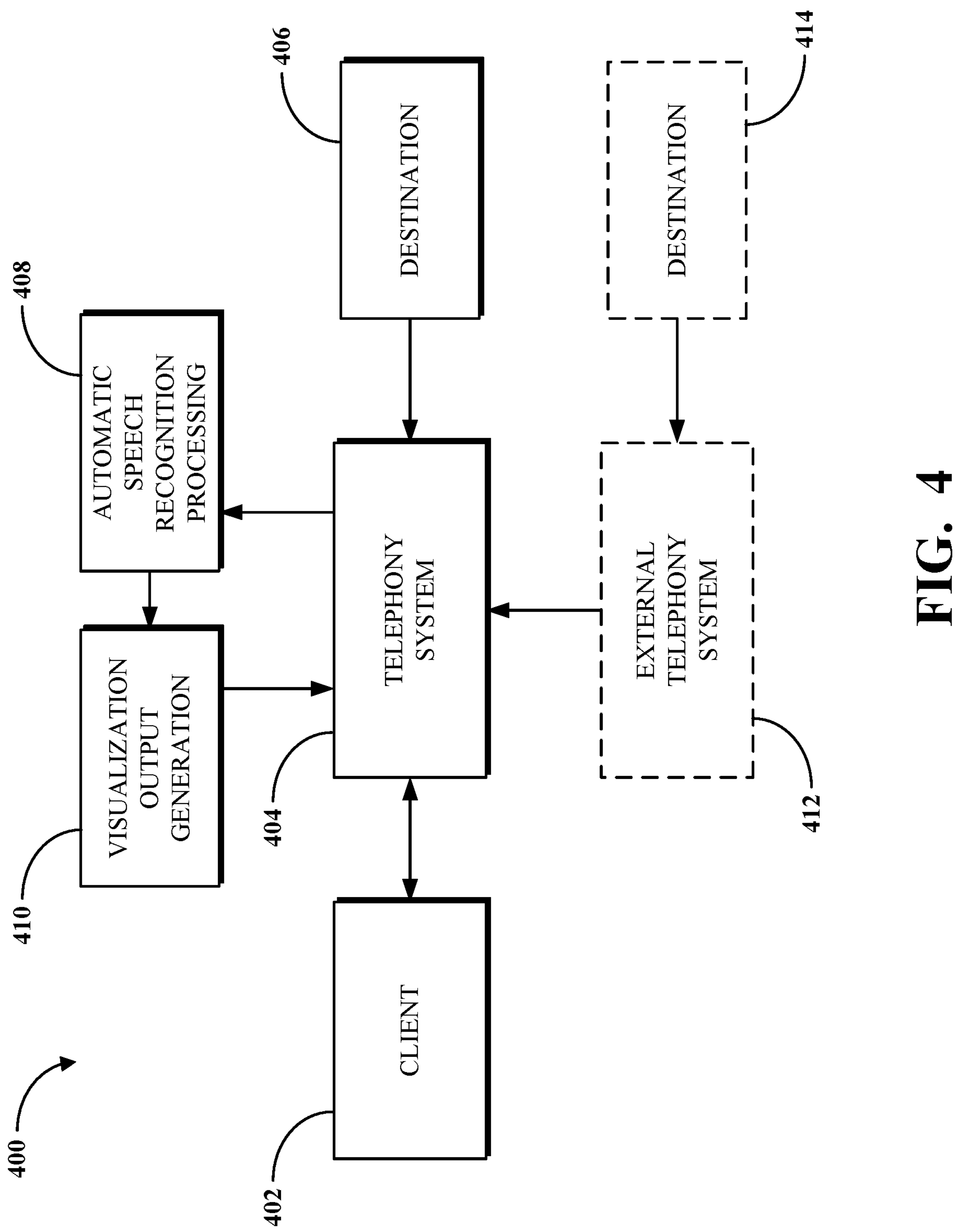
FIG. 4 is a block diagram of a system to display interactive voice response menu options.

FIG. 4 is a block diagram of a system 400 to display IVR menu options. In the system 400, a client device 402 communicates with a telephony system 404. An operator of the client device 402 may place a call through the telephony system 404 to connect the client device 402 to a destination 406. In some implementations, the destination 406 has an associated IVR system. The IVR system sends an audio stream including the IVR menu options from the destination 406 to the telephony system 404. An ASR processing tool 408 performs real-time speech recognition processing on the audio stream to identify the IVR menu options. In some implementations, the ASR processing tool 408 is a component of the telephony system 404 and is contained within the telephony system 404. In some implementations, the ASR processing tool 408 is a separate component in communication with the telephony system 404. The operation of the system 400 does not change based on the location of the ASR processing tool 408.

The identified IVR menu options are sent from the ASR processing tool 408 to a visualization output generation tool 410. The visualization output generation tool 410 creates a visualization representative of each identified IVR menu option. The visualization may include a visual prompt, text, a text box, an image including the text, or another visual indication of the content of the identified IVR menu options. The visualization of the IVR menu option is sent from the visualization output generation tool 410 to the telephony system 404. The telephony system 404 then sends the visualization to the client device 402 for display on the client device 402. In some implementations, the visualization output generation tool 410 sends the visualization directly to the client device 402. In some implementations, the visualization output generation tool 410 is a component of the telephony system 404 and is contained within the telephony system 404. In some implementations, the visualization output generation tool 410 is a separate component in communication with the ASR processing tool 408 and the telephony system 404. The operation of the system 400 does not change based on the location of the visualization output generation tool 410.

The client device 402 is configured to output all of the IVR menu options. In some implementations, where a number of the visualizations generated based on the IVR menu options exceeds a maximum number of visualizations which can be displayed at one time, such as based on a size of the visualizations, a scrollable user interface element may be used at the client device 402 to enable an operator of the client device 402 to browse through all of the visualizations. In some implementations, dimensions of the visualizations displayed at the client device 402 may be scaled at the client device 402 according to a number of the visualizations generated by the visualization output generation tool 410. For example, in one case, an IVR menu includes two or three IVR menu options and thus two or three visualizations are generated, in which those two or three visualizations may each be represented using a first size. In another case, an IVR menu includes eight or nine IVR menu options and thus eight or nine visualizations are generated, in which those eight or nine visualizations may each be represented using a second size. Because there are more visualizations to display at once in the latter case, the second size is smaller than the first size. In some implementations, and regardless of whether the visualizations are scaled or browsed using a scrollable user interface element, the visualizations generated for a set of IVR menu options may be displayed in various sizes. For example, a first visualization of a first IVR menu option may be visually represented in a first size and a second visualization of a second IVR menu option may be visually represented in a second size different from the first size.

In some implementations, after one IVR menu option has been identified from the audio stream by the ASR processing tool 408, the identified IVR menu option is sent to the visualization output generation tool 410. In some implementations, more than one or all of the IVR menu options are identified from the audio stream by the ASR processing tool 408 before being sent to the visualization output generation tool 410.

In some implementations, the system 400 may be in communication with an external telephony system 412, which can communicate with the client device 402 via the telephony system 404. The external telephony system 412 can connect a caller using the client device 402 to a destination 414. The destination 414 has an associated external IVR system. In this implementation, the external IVR system sends an audio stream including the IVR menu options from the destination 414 to the external telephony system 412. The external telephony system 412 routes the audio stream to the telephony system 404 and the audio stream is processed in a similar manner as described above for the audio stream from the IVR system associated with the destination 406 to identify the IVR menu options and to generate visualizations of the IVR menu options to be output for display at the client device 402.

In some implementations, the system 400 can include a translation tool intermediate to the which translates the ASR processing tool 408 and the visualization output generation tool 410. For example, the translation tool can include functionality, implemented using a machine learning model, a translation service native to the software platform which implements the system 400, or a translation service external to the software platform, for translating the IVR menu options identified by the ASR processing tool 408 from a first language in which the IVR menu options are identified to a second language in which to output visualizations of those IVR menu options, such as at the client device 402. The translated IVR menu options may then be processed using the visualization output generation tool 410 to generate visualizations of those IVR menu options in the second language.

Figure 5A:
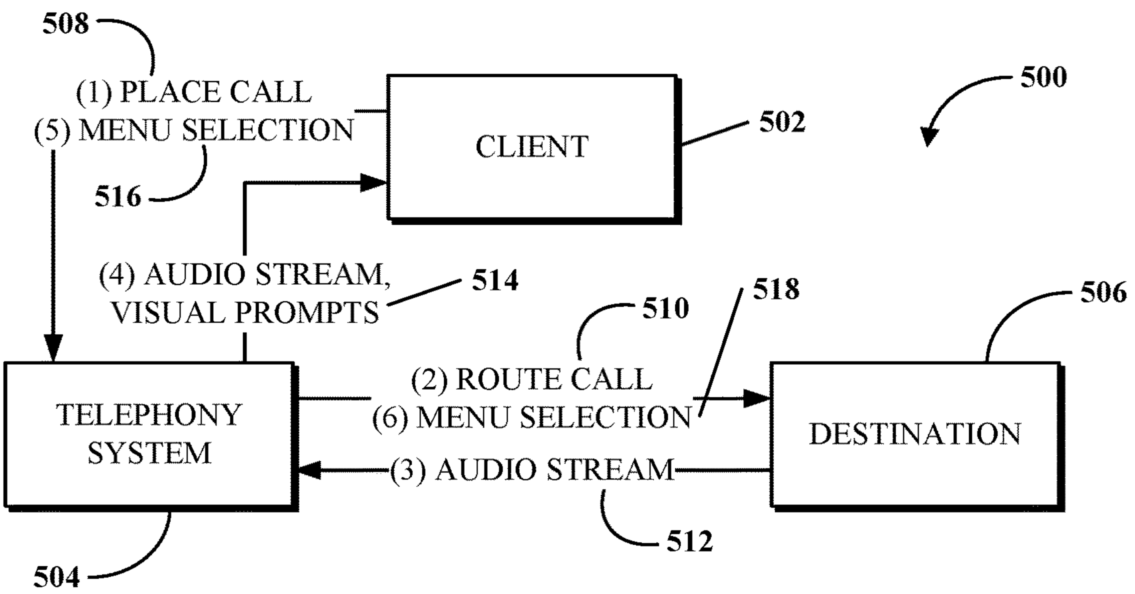
FIG. 5A is a flow diagram of a system to display interactive voice response menu options.

FIG. 5A is a flow diagram of a system 500 to display interactive voice response menu options. The system 500 includes a client device 502, a telephony system 504, and a destination 506, which may, for example, be the client device 402, the telephony system 404, and the destination 406 shown in FIG. 4. An operator of the client device 502 places a call (operation 508). The telephony system 504 receives the call from the client device 502 and routes the call to the destination 506 (operation 510). The destination 506 sends an audio stream including the IVR menu options to the telephony system 504 (operation 512). The telephony system 504 performs ASR processing to create the visual prompts for the IVR menu options from the audio stream and routes both the audio stream and the visual prompts for the IVR menu options to the client device 502 (operation 514). In some cases, the visualizations are sent to the client device 502 one at a time as they are identified by the ASR processing. In other cases, the visualizations are sent to the client device 502 as a group, which may be determined by the end of ASR processing. In some instances, the end of ASR processing may be determined by a threshold period of silence elapsing during processing.

In some implementations, each visual prompt for an IVR menu option includes text, a text box, an image including the text, or other visualization of the content of the identified IVR menu option. In some implementations, the telephony system 504 stores the visual prompts for the IVR menu options, to resend the IVR menu options to the client device 502 during the current call if requested by the client device or to send the IVR menu options to the client device 502 or a different client device for a separate call placed to the same destination 506.

In some implementations, before the IVR menu options are sent to the client device 502, a determination is made of the capabilities of the client device 502. For example, a determination may be made whether the client device 502 can display the visualizations of the IVR menu options or whether the client device 502 is capable of displaying a video. In a situation where the client device 502 cannot display the visualizations, the telephony system 504 may identify another device associated with the caller and that is known to the telephony system 504 to be able to display the visualizations. This identification and association may be based on matching operator name information or other information associated with the client device 502. In such a case, the visualizations are output for display at the other device instead of at the client device 502. In a situation where the client device 502 can display a video, the output to the client device 502 may be in video form if such video form was generated based on the identified IVR menu options.

After the visualizations have been output to the display of the client device 502, an operator of the client device 502 selects one of the menu options. The menu selection is transmitted from the client device 502 to the telephony system 504 (operation 516) and transmitted from the telephony system 504 to the destination 506 (operation 518).

Figure 5B:
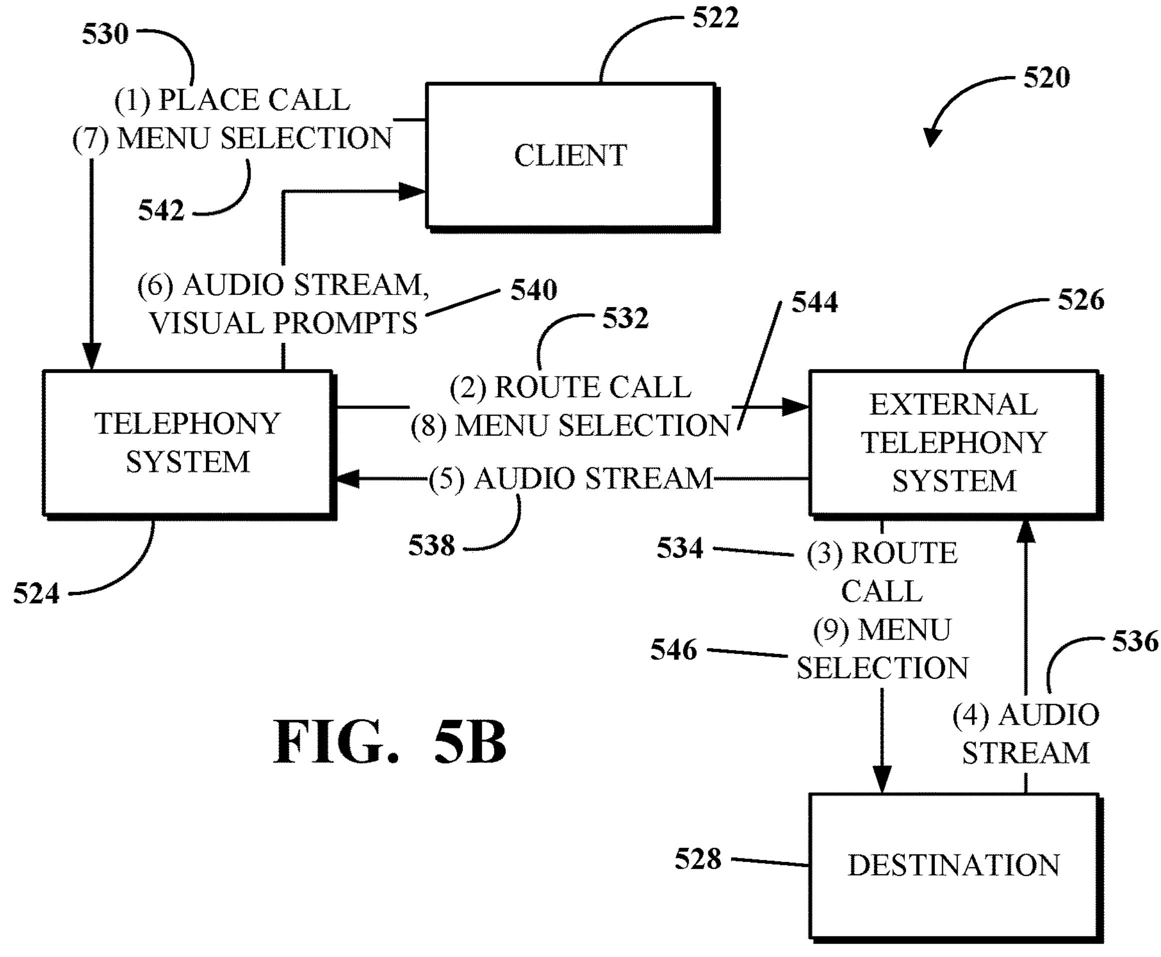
FIG. 5B is a flow diagram of an alternate system to display interactive voice response menu options.

FIG. 5B is a flow diagram of an alternate system 520 to display IVR menu options. The system 520 includes a client device 522, a telephony system 524, an external telephony system 526, and a destination 528, which may, for example, be the client device 402, the telephony system 404, the external telephony system 412, and the destination 414 shown in FIG. 4. An operator of the client device 522 places a call (operation 530). The telephony system 524 receives the call from the client device 522 and routes the call to the external telephony system 526 (operation 532). The external telephony system 526 routes the call to the destination 528 (operation 534).

The destination 528 sends an audio stream including the IVR menu options to the external telephony system 526 (operation 536). The external telephony system 526 routes the audio stream to the telephony system 524 (operation 538). The telephony system 524 performs ASR processing to create the visual prompts for the IVR menu options from the audio stream and routes both the audio stream and the visual prompts for the IVR menu options to the client device 522 (operation 540). In some cases, the visualizations are sent to the client device 522 one at a time as they are identified by the ASR processing. In other cases, the visualizations are sent to the client device 522 as a group, which may be determined by the end of ASR processing. In some instances, the end of ASR processing may be determined by a threshold period of silence elapsing during processing.

In some implementations, each visual prompt for an IVR menu option includes text, a text box, an image including the text, or other visualization of the content of the identified IVR menu option. In some implementations, the telephony system 524 stores the visual prompts for the IVR menu options, to resend the IVR menu options to the client device 522 during the current call or to send the IVR menu options to the client device 522 or a different client device for a separate call placed to the same destination 528.

In some implementations, before the IVR menu options are sent to the client device 522, a determination is made of the capabilities of the client device 522. For example, a determination may be made whether the client device 522 can display the visualizations of the IVR menu options or whether the client device 522 is capable of displaying a video. In a situation where the client device 522 cannot display the visualizations, the telephony system 524 may identify another device associated with the caller and that is known to the telephony system 524 to be able to display the visualizations. This identification and association may be based on matching operator name information or other information associated with the client device 522. In such a case, the visualizations are output for display at the other device instead of at the client device 522. In a situation where the client device 522 can display a video, the output to the client device 522 may be in video form if such video form was generated based on the identified IVR menu options.

After the visualizations have been output to the display of the client device 522, an operator of the client device 522 selects one of the menu options. The menu selection is transmitted from the client device 522 to the telephony system 524 (operation 542), transmitted from the telephony system 524 to the external telephony system 526 (operation 544), and transmitted from the external telephony system 526 to the destination 528 (operation 546).

Figure 5C:
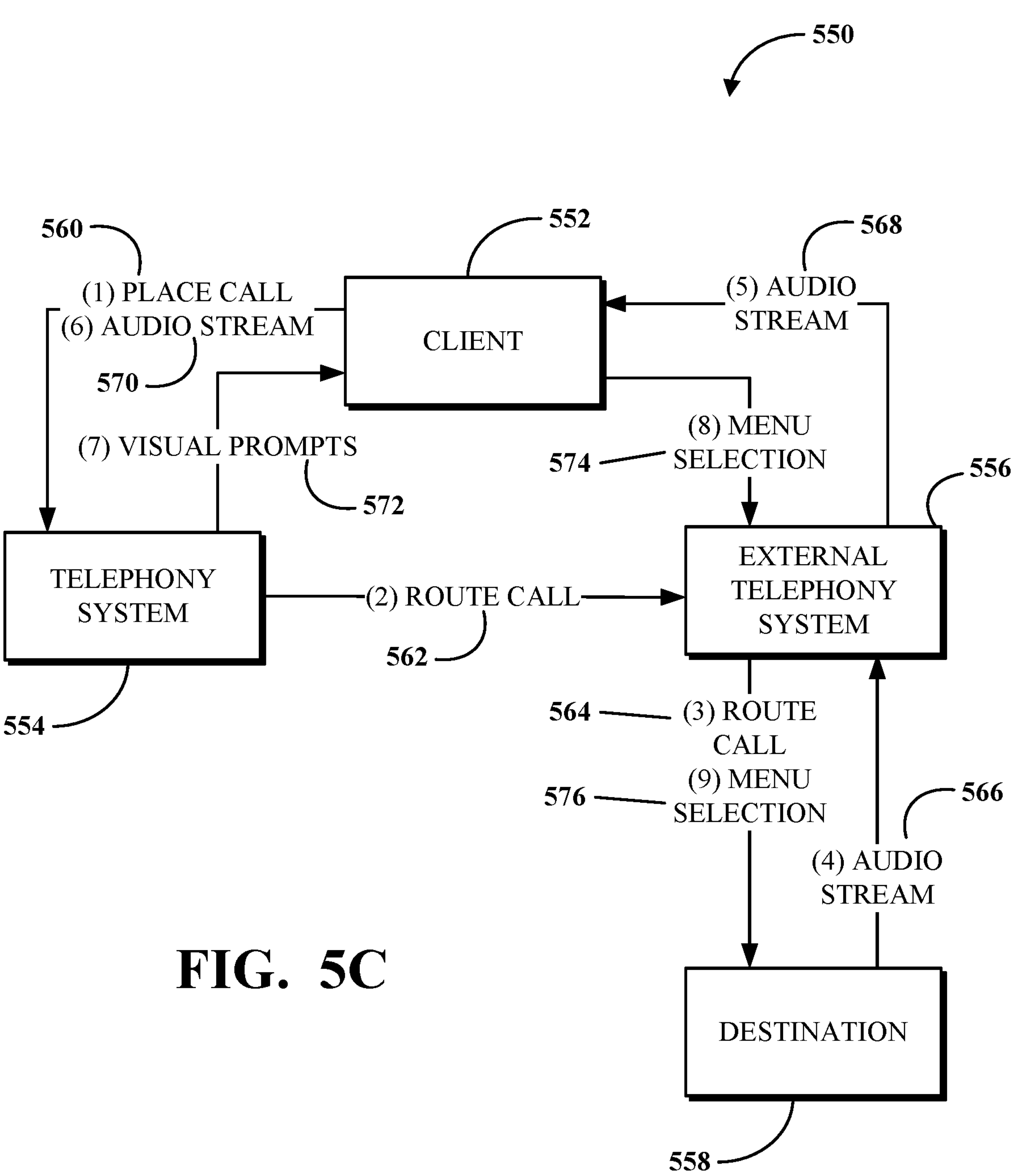
FIG. 5C is a flow diagram of another alternate system to display interactive voice response menu options.

FIG. 5C is a flow diagram of another alternate system 550 to display IVR menu options. The system 550 includes a client device 552, a telephony system 554, an external telephony system 556, and a destination 558, which may, for example, be the client device 402, the telephony system 404, the external telephony system 412, and the destination 414 shown in FIG. 4. An operator of the client device 552 places a call (operation 560). The telephony system 554 receives the call from the client device 552 and routes the call to the external telephony system 556 (operation 562). The external telephony system 556 routes the call to the destination 558 (operation 564).

The destination 558 sends an audio stream including the IVR menu options to the external telephony system 556 (operation 566). The external telephony system 556 routes the audio stream to the client device 552 (operation 568). The client device 552 routes the audio stream to the telephony system 554 (operation 570). The telephony system 554 performs ASR processing to create the visual prompts for the IVR menu options from the audio stream and routes the visual prompts for the IVR menu options to the client device 552 (operation 572). In some cases, the visualizations are sent to the client device 552 one at a time as they are identified by the ASR processing. In other cases, the visualizations are sent to the client device 552 as a group, which may be determined by the end of ASR processing. In some instances, the end of ASR processing may be determined by a threshold period of silence elapsing during processing.

In some implementations, each visual prompt for an IVR menu option includes text, a text box, an image including the text, or other visualization of the content of the identified IVR menu option. In some implementations, the telephony system 554 stores the visual prompts for the IVR menu options, to resend the IVR menu options to the client device 552 during the current call or to send the IVR menu options to the client device 552 or a different client device for a separate call placed to the same destination 558.

In some implementations, before the IVR menu options are sent to the client device 552, a determination is made of the capabilities of the client device 552. For example, a determination may be made whether the client device 552 can display the visualizations of the IVR menu options or whether the client device 552 is capable of displaying a video. In a situation where the client device 552 cannot display the visualizations, the telephony system 554 may identify another device associated with the caller and that is known to the telephony system 554 to be able to display the visualizations. This identification and association may be based on matching operator name information or other information associated with the client device 552. In such a case, the visualizations are output for display at the other device instead of at the client device 552. In a situation where the client device 552 can display a video, the output to the client device 552 may be in video form if such video form was generated based on the identified IVR menu options.

After the visualizations have been output to the display of the client device 552, an operator of the client device 552 selects one of the menu options. The menu selection is transmitted from the client device 552 to the external telephony system 556 (operation 574) and transmitted from the external telephony system 556 to the destination 558 (operation 576). In some implementations, the menu selection is transmitted from the client device 552 to the telephony system 554, transmitted from the telephony system 554 to the external telephony system 556, and transmitted from the external telephony system 556 to the destination 558.

Figure 6:
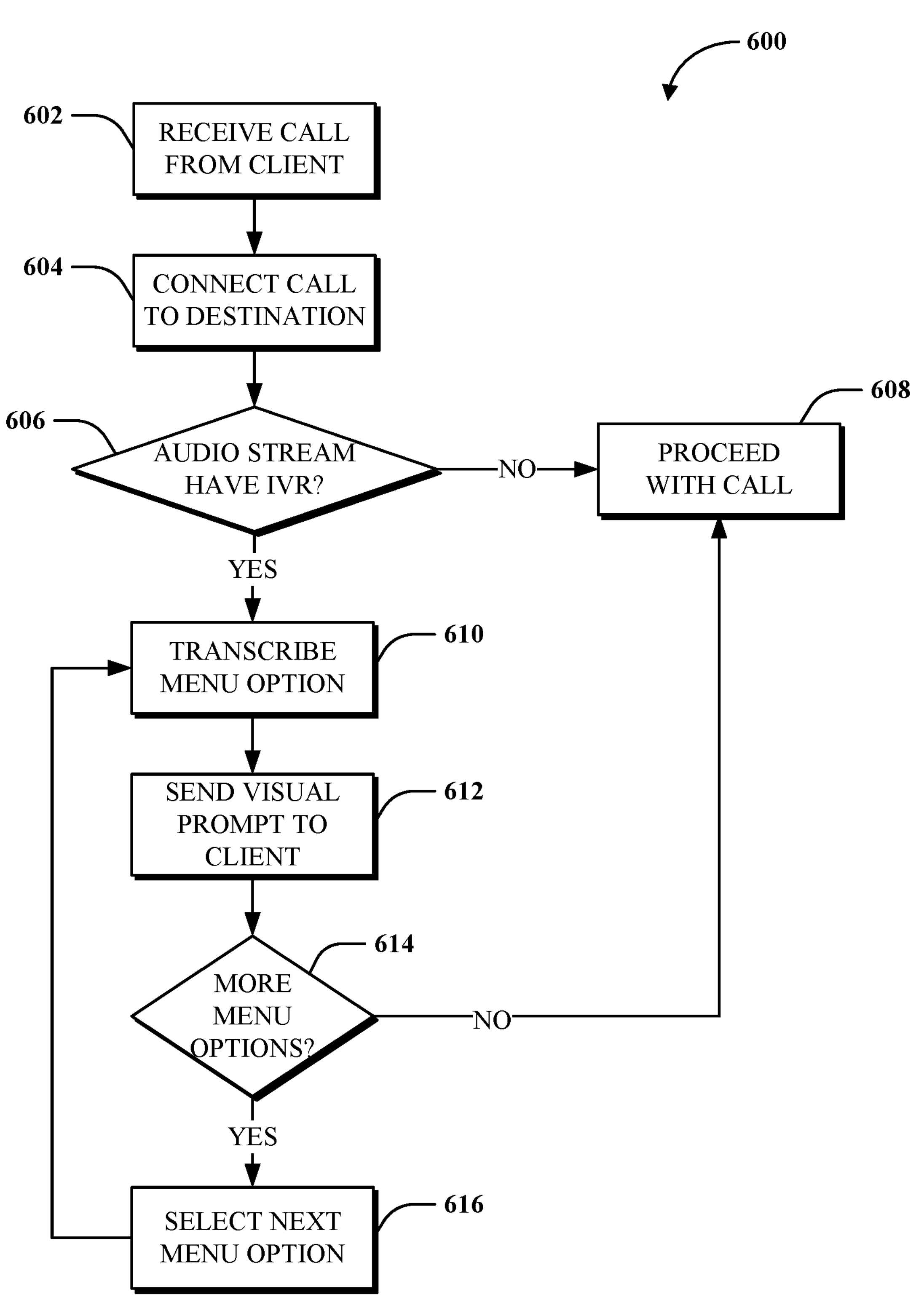
FIG. 6 is a flowchart of a technique performed by a telephony system for receiving an audio stream and displaying interactive voice response menu options.

FIG. 6 is a flowchart of a technique 600 performed by a telephony system for receiving an audio stream and displaying IVR menu options. The technique 600 may, for example, be performed by the telephony system 504 of FIG. 5A or by the telephony system 524 of FIG. 5B. The telephony system receives a call from a client device (operation 602). The telephony system connects the call to a destination (operation 604). In the implementation shown in FIG. 5A, the telephony system 504 connects the call directly to the destination 506. In the implementation shown in FIG. 5B, the telephony system 524 connects the call to the destination 528 by routing the call through the external telephony system 526 to the destination 528.

A determination is made whether the audio stream received by the telephony system from the destination includes any IVR menu options (operation 606). If the audio stream does not include any IVR menu options (operation 606, "no" branch), the telephony system routes the audio stream to the client device to proceed with the call (operation 608).

If the audio stream includes IVR menu options (operation 606, "yes" branch), the telephony system transcribes the first IVR menu option via ASR processing (operation 610). The telephony system generates and sends a visual prompt corresponding to the transcribed IVR menu option to the client device (operation 612). If there are no more IVR menu options (operation 614, "no" branch), then the operator of the client device can proceed with the call (operation 608). If there are more IVR menu options (operation 614, "yes" branch), then the next IVR menu option is selected (operation 616) and the selected IVR menu option is transcribed (operation 610) as described above. In some implementations, the telephony system waits until all IVR menu options have been identified before outputting any of the identified IVR menu options for display on the client device.

Figure 7:
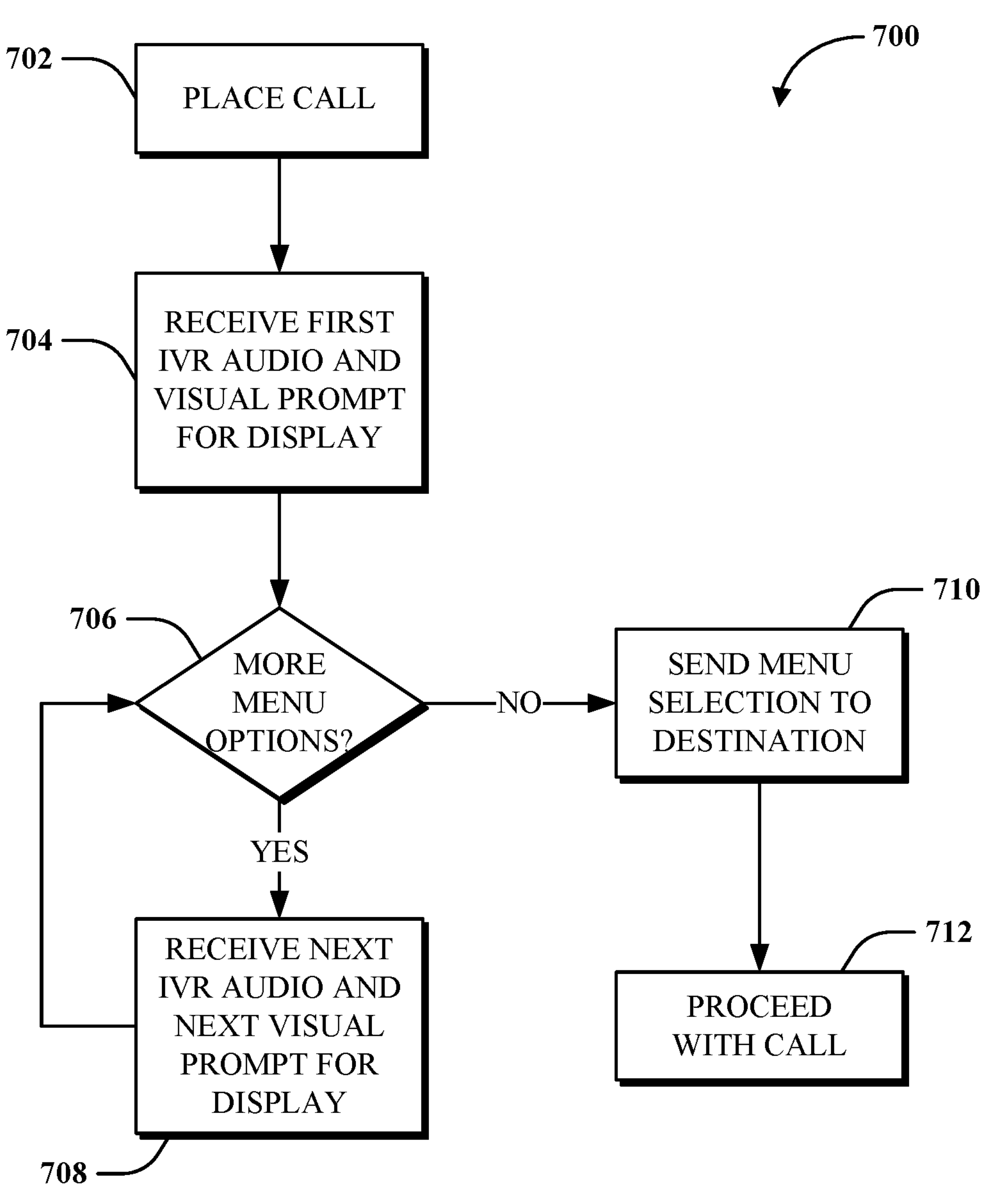
FIG. 7 is a flowchart of a technique performed by a client device for receiving interactive voice response menu options.

FIG. 7 is a flowchart of a technique 700 performed by a client device for receiving IVR menu options. The technique 700 may, for example, be performed by the client device 502 of FIG. 5A or the client device 522 of FIG. 5B. An operator of the client device places a call to a destination from the client device (operation 702).

After the call has been connected to the destination, the client device receives, from the destination via a telephony system intermediate to the client device and the destination, an audio stream for the first IVR menu option and a corresponding visual prompt for the IVR menu option for display (operation 704). In some implementations, the visual prompt for the IVR menu option is displayed on the client device that placed the call. For example, the visual prompt for the IVR menu option may be displayed in a same application, browser, system, or other window in which the call was placed. In some implementations, the visual prompt for the IVR menu option may be displayed on the client device in a different window than the one in which the call was placed. In some implementations, if the client device does not include a display, the visual prompt for the IVR menu option may be routed to a secondary device that is associated with the client device and includes a display; for example, to a web browser or other application running on the secondary device.

In some implementations, the visual prompt for the IVR menu option is displayed as a block of text on the display. In some implementations, the visual prompt may include graphical embellishments to distinguish different parts of the IVR menu option. For example, a number associated with the IVR menu option may be displayed in a different color, a different font size or style, or a different font from the substantive text of the IVR menu option.

If there are more IVR menu options to be processed (operation 706, "yes" branch), then the client device receives an audio stream for the next IVR menu option and the corresponding visual prompt for the next IVR menu option for display (operation 708). If there are no more IVR menu options to be processed (operation 706, "no" branch), then the operator of the client device selects a menu option, which is sent to the destination (operation 710). In the implementation shown in FIG. 5A, the selected menu option is sent from the client device 502 to the destination 506 via the telephony system 504. In the implementation shown in FIG. 5B, the selected menu option is sent from the client device 522 to the destination 528 via the telephony system 524 and the external telephony system 526. The operator of the client device then proceeds with the call (operation 712). In some implementations, the client device may receive all of the visual prompts for all of the IVR menu options at once.

Figure 8:
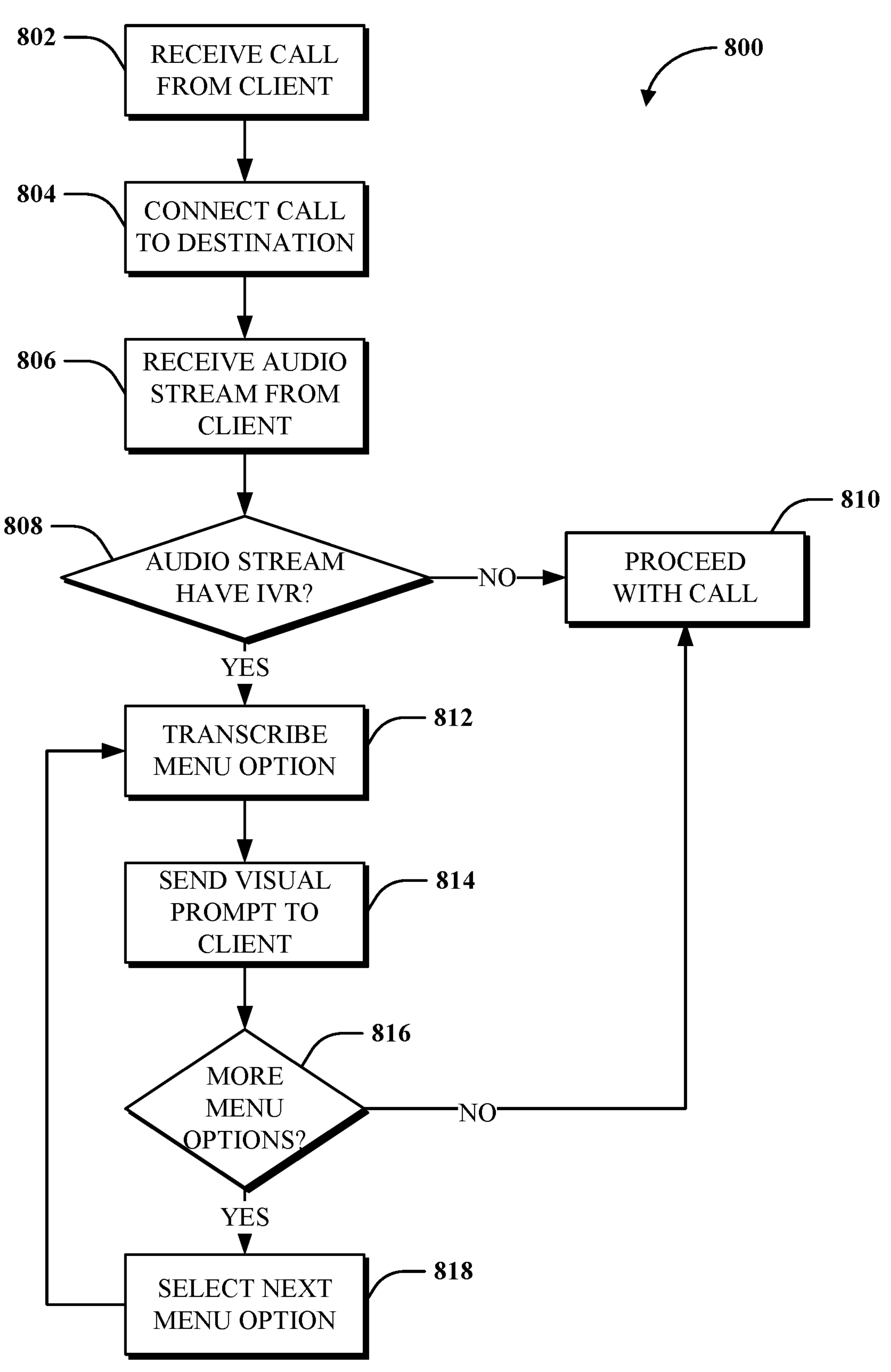
FIG. 8 is a flowchart of an alternate technique performed by a telephony system for receiving an audio stream and displaying interactive voice response menu options.

FIG. 8 is a flowchart of an alternate technique 800 performed by a telephony system for receiving an audio stream and displaying IVR menu options. The technique 800 may, for example, be performed by the telephony system 554 of FIG. 5C. The telephony system receives a call from a client device (operation 802). The telephony system connects the call to a destination (operation 804). In the implementation shown in FIG. 5C, the telephony system 554 connects the call to the destination 558 by routing the call through the external telephony system 556 to the destination 558.

The telephony system receives an audio stream from the client device (operation 806). In the implementation shown in FIG. 5C, the destination 558 routes the audio stream to the external telephony system 556, which routes the audio stream to the client device 552.

Next, a determination is made whether the audio stream received by the telephony system from the destination includes any IVR menu options (operation 808). If the audio stream does not include any IVR menu options (operation 808, "no" branch), the operator of the client device proceeds with the call (operation 810).

If the audio stream includes IVR menu options (operation 808, "yes" branch), the telephony system transcribes the first IVR menu option via ASR processing (operation 812). The telephony system sends a visual prompt corresponding to the transcribed IVR menu option to the client device (operation 814). If there are no more IVR menu options (operation 816, "no" branch), then the operator of the client device can proceed with the call (operation 810). If there are more IVR menu options (operation 816, "yes" branch), then the next IVR menu option is selected (operation 818) and the selected IVR menu option is transcribed (operation 812) as described above. In some implementations, the telephony system waits until all IVR menu options have been identified before outputting any of the identified IVR menu options for display on the client device.

Figure 9:
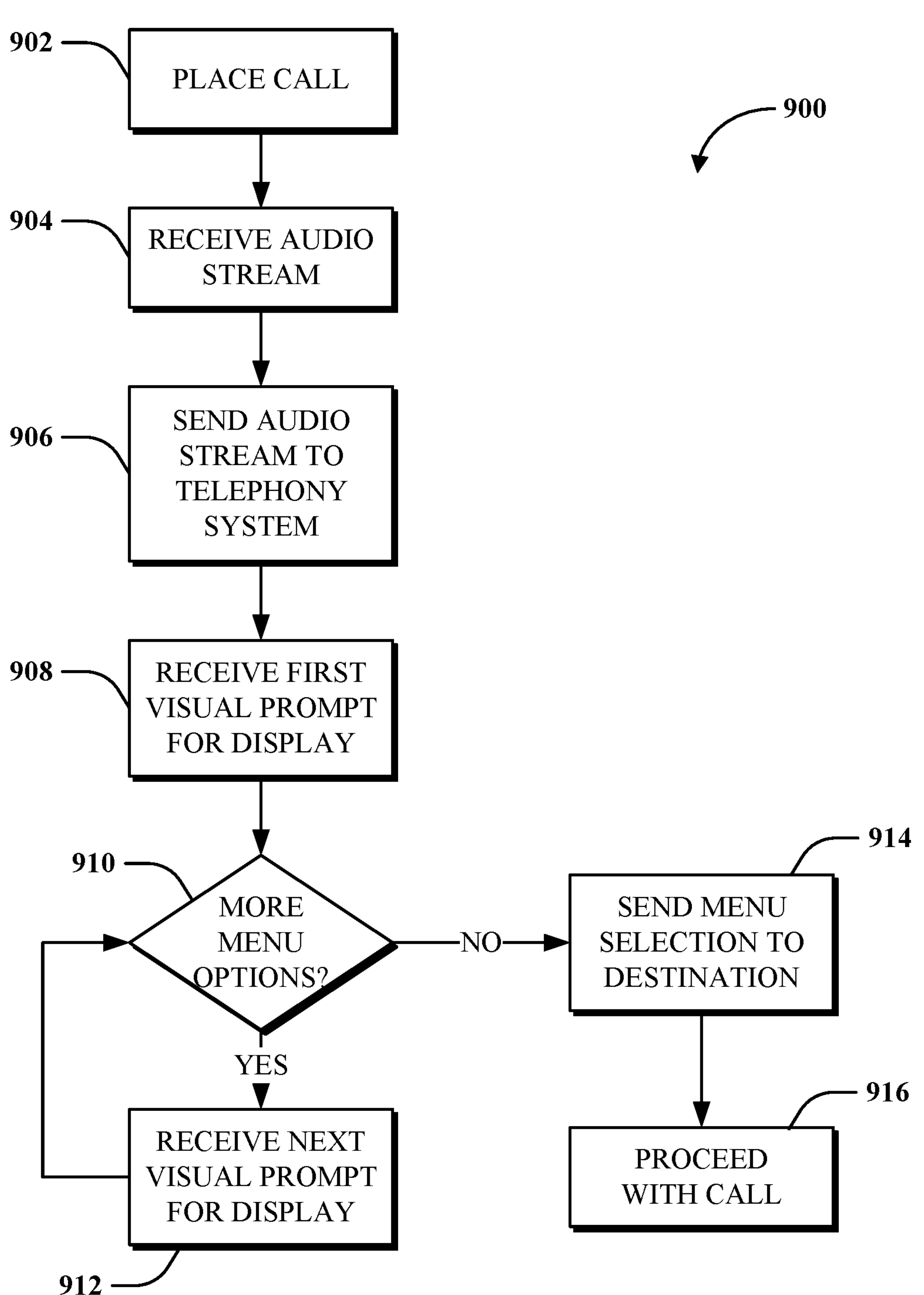
FIG. 9 is a flowchart of an alternate technique performed by a client device for receiving interactive voice response menu options.

FIG. 9 is a flowchart of an alternate technique 900 performed by a client device for receiving IVR menu options. The technique 900 may, for example, be performed by the client device 552 of FIG. 5C. An operator of the client device places a call to a destination (operation 902).

After the call has been connected to a destination, the client device receives, from the destination via a telephony system through which the call is routed from an external telephony system intermediate to the telephony system and the destination, an audio stream (operation 904). The client device sends the audio stream to the telephony system for ASR processing (operation 906). The client device receives a visual prompt for the first IVR menu option for display (operation 908). In some implementations, the visual prompt for the IVR menu option is displayed on the client device that placed the call. For example, the visual prompt for the IVR menu option may be displayed in a same application, browser, system, or other window in which the call was placed. In some implementations, the visual prompt for the IVR menu option may be displayed on the client device in a different window than the one in which the call was placed. In some implementations, if the client device does not include a display, the visual prompt for the IVR menu option may be routed to a secondary device that is associated with the client device and includes a display; for example, to a web browser or other application running on the secondary device.

In some implementations, the visual prompt for the IVR menu option is displayed as a block of text on the display. In some implementations, the visual prompt may include graphical embellishments to distinguish different parts of the IVR menu option. For example, a number associated with the IVR menu option may be displayed in a different color, a different font size or style, or a different font from the substantive text of the IVR menu option.

If there are more IVR menu options to be processed (operation 910, "yes" branch), then the client device receives the visual prompt for the next IVR menu option for display (operation 912). If there are no more IVR menu options to be processed (operation 910, "no" branch), then the operator of the client device selects a menu option, which is sent to the destination (operation 914). In the implementation shown in FIG. 5C, the selected menu option is sent from the client device 552 to the destination 558 via the telephony system 554 and the external telephony system 556. The operator of the client device then proceeds with the call (operation 916). In some implementations, the client device may receive all of the visual prompts for all of the IVR menu options at once.

Figure 10:
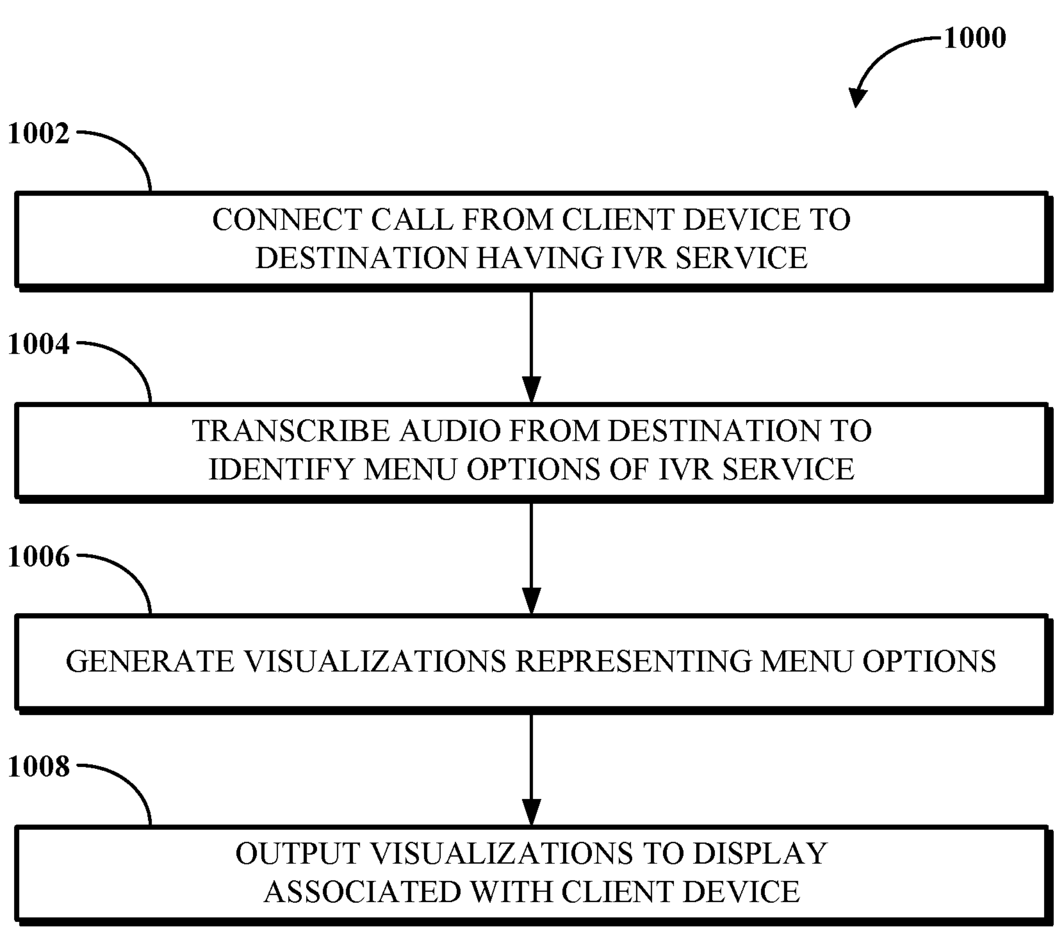
FIG. 10 is a flowchart of an example of a technique for displaying interactive voice response menu options.

FIG. 10 is a flowchart of an example of a technique 1000 for displaying visual IVR menu options on a client device. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps or operations of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At operation 1002, a call from a client device is connected to a destination having an IVR service. At operation 1004, audio from the destination is transcribed to identify menu options of the IVR service. At operation 1006, visualizations representing the menu options of the IVR service are generated. At operation 1008, the visualizations are output to a display associated with the client device that placed the call.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

determining, during a call associated with an interactive voice response service, a first menu option of a current menu of the interactive voice response service;

outputting, for display at a device during the call, a first visualization generated to represent the first menu option;

determining, during the call and based on the current menu including one or more other menu options, a second menu option of the current menu; and outputting, for display at the device during the call, a second visualization generated to represent the second menu option.

2. The method of claim 1, wherein determining the second menu option of the current menu comprises:

determining the second menu option after the first visualization is output.

3. The method of claim 1, wherein determining a menu option of the current menu of the interactive voice response service comprises:

transcribing audio of the call.

4. The method of claim 3, wherein the menu options are determined using a telephony system of a software platform and the audio of the call is transcribed using a transcription service of the software platform.

5. The method of claim 3, wherein the menu options are determined using a telephony system of a software platform and the audio of the call is transcribed using a transcription service external to the software platform.

6. The method of claim 1, comprising:

determining a selection of one of the first visualization or the second visualization at the device; and indicating the selection to the interactive voice response service.

7. The method of claim 1, comprising:
determining whether the device is video-enabled.

8. The method of claim 1, comprising:
routing the call through an external telephony system.

9. The method of claim 1, comprising:
generating the first visualization during the call; and
generating the second visualization during the call.

10. A non-transitory computer readable medium storing instructions operable to cause one or more processors to perform operations comprising:
determining, during a call associated with an interactive voice response service, a first menu option of a current menu of the interactive voice response service;
outputting, for display at a device during the call, a first visualization generated to represent the first menu option;
determining, during the call and based on the current menu including one or more other menu options, a second menu option of the current menu; and
outputting, for display at the device during the call, a second visualization generated to represent the second menu option.

11. The non-transitory computer readable medium of claim 10, wherein the first visualization is output before the second visualization is output.

12. The non-transitory computer readable medium of claim 10, the operations comprising:
performing a real-time transcription process against audio of the call to determine the first menu option and the second menu option.

13. The non-transitory computer readable medium of claim 10, wherein the device is a secondary device in communication with a calling device used to initiate the call.

14. The non-transitory computer readable medium of claim 10, wherein one or more of the first visualization or the second visualization includes one or more of image content or video content.

15. A system, comprising:
one or more memories; and
one or more processors configured to execute instructions stored in the one or more memories to:
determine, during a call associated with an interactive voice response service, a first menu option of a current menu of the interactive voice response service;
output, for display at a device during the call, a first visualization generated to represent the first menu option;
determine, during the call and based on the current menu including one or more other menu options, a second menu option of the current menu; and
output, for display at the device during the call, a second visualization generated to represent the second menu option.

16. The system of claim 15, wherein the first visualization is output before the second menu option is determined.

17. The system of claim 15, wherein the first menu option and the second menu option are separately determined based on a real-time transcription process performed against audio of the call.

18. The system of claim 15, wherein the device is one of a calling device used to initiate the call or a secondary device in communication with the calling device.

19. The system of claim 15, wherein the call is routed to a destination through an external telephony system.

20. The system of claim 15, wherein the menu options are determined and the visualizations are output using one or more services of a unified communications as a service software platform.

* * * * *